United States Patent
Kim et al.

(10) Patent No.: US 7,722,249 B2
(45) Date of Patent: May 25, 2010

(54) BODY-TEMPERATURE MEASURING DEVICE AND BODY-TEMPERATURE MEASURING SYSTEM HAVING THE DEVICE

(75) Inventors: Jong-pal Kim, Seoul (KR); Kun-soo Shin, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 12/103,721

(22) Filed: Apr. 16, 2008

(65) Prior Publication Data

US 2009/0154523 A1    Jun. 18, 2009

(30) Foreign Application Priority Data

Dec. 17, 2007    (KR) .................... 10-2007-0132647

(51) Int. Cl.
*G01K 1/00* (2006.01)
*G01K 7/00* (2006.01)

(52) U.S. Cl. .................. 374/208; 374/163; 600/549

(58) Field of Classification Search .............. 374/208, 374/163; 600/549
See application file for complete search history.

(56) References Cited

U.S. PATENT DOCUMENTS

| | | | | |
|---|---|---|---|---|
| 3,949,388 | A * | 4/1976 | Fuller .................... | 340/870.17 |
| 5,050,612 | A * | 9/1991 | Matsumura ................ | 600/483 |
| 6,238,354 | B1 * | 5/2001 | Alvarez ..................... | 600/549 |
| 2001/0044588 | A1 * | 11/2001 | Mault ......................... | 600/549 |
| 2003/0149349 | A1 * | 8/2003 | Jensen ........................ | 600/372 |
| 2003/0163287 | A1 * | 8/2003 | Vock et al. ................. | 702/187 |
| 2005/0099294 | A1 * | 5/2005 | Bogner et al. .............. | 340/540 |
| 2005/0148003 | A1 * | 7/2005 | Keith et al. ..................... | 435/6 |
| 2005/0154327 | A1 * | 7/2005 | Nakazawa ................... | 600/549 |
| 2005/0197540 | A1 * | 9/2005 | Liedtke ....................... | 600/300 |
| 2005/0280531 | A1 * | 12/2005 | Fadem et al. ........... | 340/539.12 |
| 2006/0056487 | A1 * | 3/2006 | Kuroda et al. ............... | 374/179 |
| 2006/0122473 | A1 * | 6/2006 | Kill et al. ..................... | 600/300 |
| 2006/0155173 | A1 * | 7/2006 | Anttila et al. ............... | 600/300 |
| 2007/0043304 | A1 * | 2/2007 | Katayama .................... | 600/549 |
| 2007/0100666 | A1 * | 5/2007 | Stivoric et al. ................. | 705/3 |
| 2007/0106172 | A1 * | 5/2007 | Abreu ......................... | 600/549 |
| 2007/0167848 | A1 * | 7/2007 | Kuo et al. .................... | 600/509 |
| 2007/0191728 | A1 * | 8/2007 | Shennib ....................... | 600/546 |
| 2007/0206655 | A1 * | 9/2007 | Haslett et al. ............... | 374/141 |
| 2007/0208233 | A1 * | 9/2007 | Kovacs ........................ | 600/300 |
| 2007/0282218 | A1 * | 12/2007 | Yarden ........................ | 600/549 |
| 2008/0214949 | A1 * | 9/2008 | Stivoric et al. .............. | 600/549 |
| 2009/0030289 | A1 * | 1/2009 | Katayama et al. ........... | 600/301 |
| 2009/0209896 | A1 * | 8/2009 | Selevan ........................ | 602/41 |

* cited by examiner

*Primary Examiner*—Lisa M Caputo
*Assistant Examiner*—Mirellys Jagan
(74) *Attorney, Agent, or Firm*—Sughrue Mion, PLLC

(57) ABSTRACT

A body-temperature measuring device is provided. The device includes: a pad which is attachable to and detachable from a human body; a battery which is provided to the pad and includes a pair of battery terminals for supplying power; and a temperature sensing block which is attached to and detached from the pad and comprises units for contacting the human body to sense temperature and wirelessly transmitting a temperature sensing signal corresponding to the sensed temperature and a pair of connecting terminals which are electrically connected to the battery terminals only when attached to the pad, and a body-temperature measuring system including one or more of the body-temperature measuring devices and a receiver which receives the wirelessly transmitted temperature sensing signal, measures the temperature by using the received signal, and informs of a result of measuring the temperature.

11 Claims, 5 Drawing Sheets

BODY-TEMPERATURE MEASURING DEVICE AND BODY-TEMPERATURE MEASURING SYSTEM HAVING THE DEVICE

CROSS-REFERENCE TO RELATED PATENT APPLICATION

This application claims priority from Korean Patent Application No. 10-2007-0132647, filed on Dec. 17, 2007, in the Korean Intellectual Property Office, the disclosure of which is incorporated herein in its entirety by reference.

BACKGROUND OF THE INVENTION

1. Field of the Invention

Apparatuses consistent with the present invention relate to a body-temperature measuring device, and more particularly, to a body-temperature measuring device which automatically measures temperature when attached to the human body and a body-temperature measuring system having the device.

2. Description of the Related Art

When physical problems due to illnesses such as a cold occur, body temperature needs to be periodically measured to check a state of the body. In a related art, body temperature is measured by contacting or inserting a thermometer to or into the armpit, the mouth, the ear, the forehead, and the like, and this needs help of a patient. For example, when a patient is an infant or a little child, the patient cannot help a measuring person to measure temperature. In addition, although the patient is sleeping, in order to measure temperature, the patient has to wake up, and it is inconvenient for the patient. In addition, in order to measure temperature late at night or at dawn, the measuring person also has to wake up, and this also causes inconvenience.

SUMMARY OF THE INVENTION

The present invention provides a body-temperature measuring device for automatically measuring temperature of a patient without assists of a measuring person or the patient and a body-temperature measuring system having the device.

The present invention also provides a body-temperature measuring device which is implemented to have a small size to be attachable to the human body and simply measure temperature and a body-temperature measuring system having the device.

The present invention also provides a body-temperature measuring device which includes a temperature sensor and can be re-used without sanitary problems by sterilizing a main portion and a body-temperature measuring system having the device.

According to an aspect of the present invention, there is provided a body-temperature measuring device comprising: a pad which is attachable to and detachable from the human body; a battery which is provided to the pad and includes a pair of battery terminals for supplying power; and a temperature sensing block which is attached to and detached from the pad and comprises units for contacting the human body to sense temperature and wirelessly transmitting a temperature sensing signal corresponding to the sensed temperature and a pair of connecting terminals which are electrically connected to the battery terminals only when attached to the pad. According to another aspect of the present invention, there is provided a body-temperature measuring system comprising: at least one of the above-mentioned body-temperature measuring system; and a receiver which receives the wirelessly transmitted temperature sensing signal, measures the temperature by using the received signal, and informs of a result of measuring the temperature.

The units for sensing the temperature and wirelessly transmitting the temperature sensing signal may operate as long as the pair of the battery terminals and the pair of the connecting terminals may be electrically connected, respectively.

According to another aspect of the present invention, there is provided a body-temperature measuring device comprising: a pad which is attachable to and detachable from the human body; a conductive line provided to a side surface of the pad facing the human body; and a temperature sensing block which is attached to and detached from the pad and comprises a battery for supplying power, units for contacting the human body and sensing temperature by using the power supplied from the battery and wirelessly transmitting a temperature sensing signal corresponding to the sensed temperature, and a pair of connecting terminals which are electrically connected through the conductive line only when attached to the pad. According to another aspect of the present invention, there is provided a body-temperature measuring system comprising: at least one of the above-mentioned body-temperature measuring system; and a receiver which receives the wirelessly transmitted temperature sensing signal, measures the temperature by using the received signal, and informs of a result of measuring the temperature.

The units for sensing the temperature and wirelessly transmitting the temperature sensing signal may operate as long as the conductive line and the pair of the connecting terminals may be electrically connected.

The temperature sensing block may be sealed to be prevented from being polluted.

The temperature sensing block periodically may sense temperature and transmits the temperature sensing signal.

The conductive line and the connecting terminals are connected by conductive snap fasteners or conductive Velcro fasteners or by using a conductive gel as a medium.

The pad may include a bracket for supporting the temperature sensing block attached to the pad so that the temperature sensing block is not moved.

The receiver may inform of the result by using beeps, warning lights, or warning images.

The body-temperature measuring system may comprise a plurality of the body-temperature measuring devices, wherein a temperature sensing block included in each of the body-temperature measuring devices inserts an ID (identification) code into the temperature sensing signal to be wirelessly transmitted, and wherein the receiver identifies the source of the wirelessly received temperature sensing signal by using the ID code.

BRIEF DESCRIPTION OF THE DRAWINGS

The above and other aspects of the present invention will become more apparent by describing in detail exemplary embodiments thereof with reference to the attached drawings, in which.

DETAILED DESCRIPTION OF EXEMPLARY EMBODIMENTS

Hereinafter, a body-temperature measuring device and a body-temperature measuring system having the device according to exemplary embodiments of the present invention will be described in detail with reference to the attached drawings.

Figure 1:
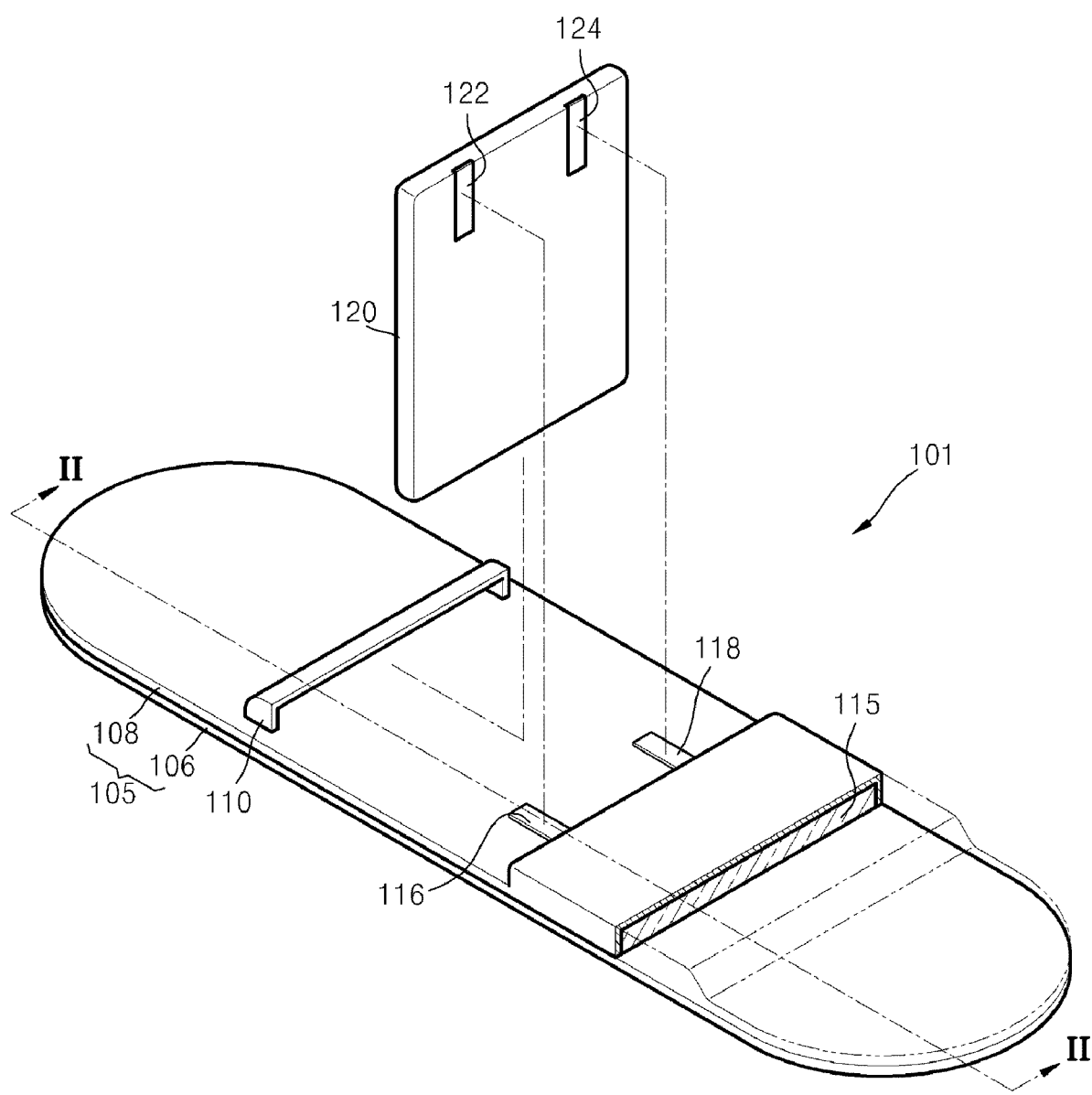
FIG. 1 is an exploded perspective view of a body-temperature measuring device according to an exemplary embodiment of the present invention.
Figure 2:
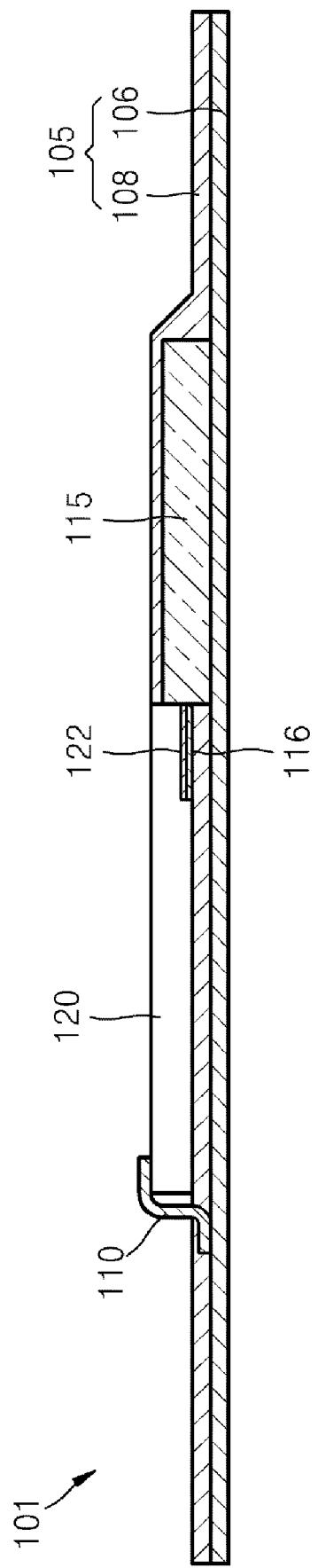
FIG. 2 is a cross-sectional view taken along line II-II of FIG. 1, according to an exemplary embodiment of the present invention.
Figure 3:
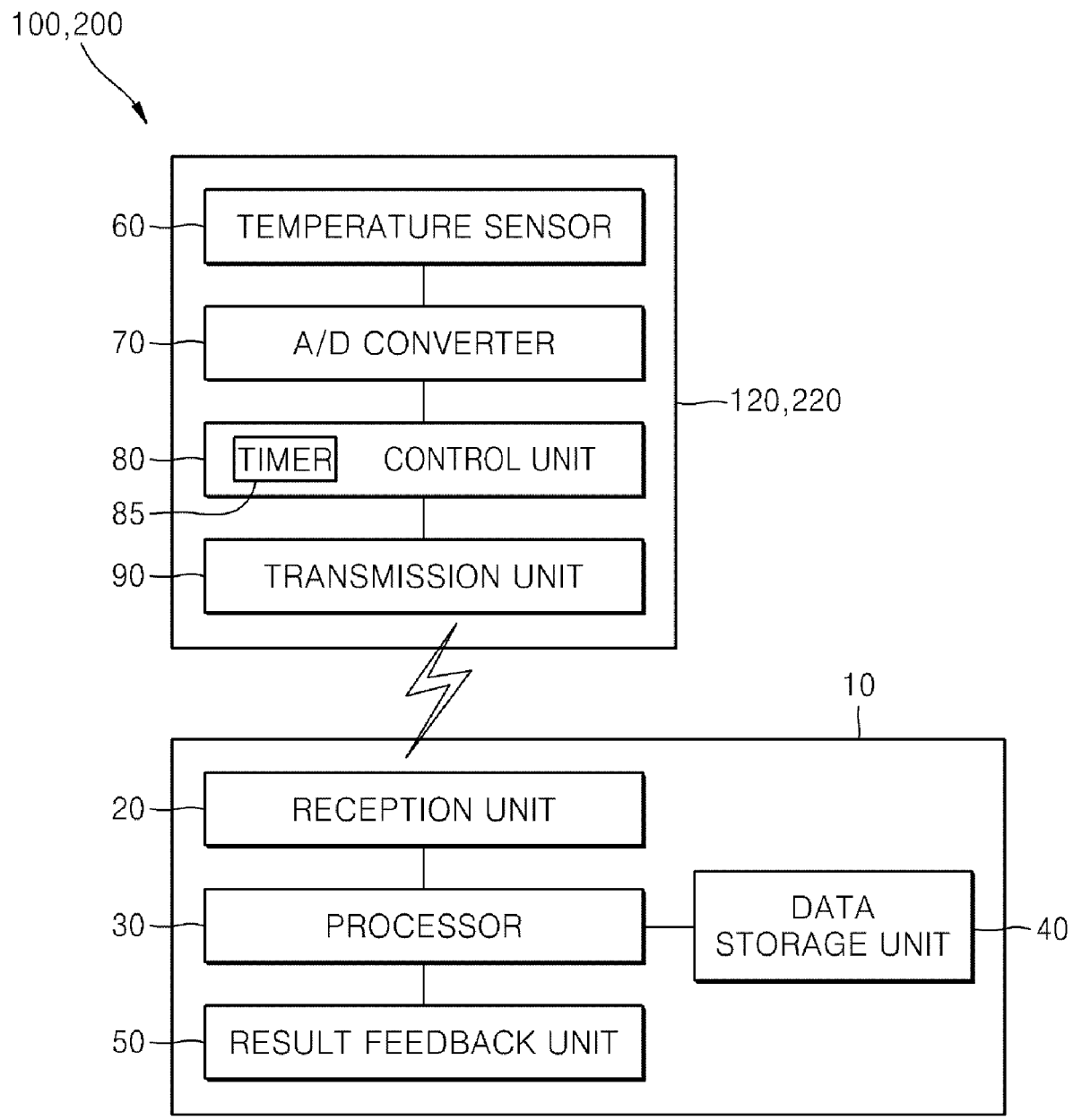
FIG. 3 is a block diagram of a body-temperature measuring system according to the exemplary embodiment of the present invention.

FIG. 1 is an exploded perspective view of a body-temperature measuring device according to an exemplary embodiment of the present invention. FIG. 2 is a cross-sectional view taken along line II-II of FIG. 1. FIG. 3 is a block diagram of a body-temperature measuring system according to the exemplary embodiment of the present invention.

Referring to FIGS. 1 to 3, a body-temperature measuring system 100 according to the exemplary embodiment of the present invention includes a body-temperature measuring device 101 which is attached to the human body to sense temperature and wirelessly transmits a temperature sensing signal corresponding to the sensed temperature and a receiver 10 which receives the wirelessly transmitted temperature sensing signal to measure the temperature. The body-temperature measuring device 101 includes a pad 105 that is attachable to and detachable from the human body, a battery 115 provided to the pad 105, and a temperature sensing block 120 that is supplied with power from the battery 115 to operate.

The pad 105 may be a pad having a shape similar to a disposable bandage attached to protect a skin injury. Specifically, the pad 105 may include a flexible first sheet 106 and a second sheet 108 which is overlapped and adhered to the first sheet 106. An exposed surface of the second sheet 108 is applied with an adhesive (not shown) so that the pad 105 can be attached to and detached from the skin.

The battery 115 may be a non-rechargeable battery or rechargeable battery. The battery 115 may have a flat type to be easily attached to the pad 105 or a flexible type to be easily bent to be attached to the human body having bends. The battery 115 may be interposed between the first and second sheets 106 and 108 which are adhered to each other so as to be mounted to the pad 105. The battery 115 includes a pair of battery terminals 116 and 118 for power supply. The first and second battery terminals 116 and 118 are exposed from the second sheet 108.

The temperature sensing block 120 is attachable to and detachable from the center portion of the exposed surface of the second sheet 108 applied with the adhesive, and includes units for contacting the human body, that is, the skin to sense body-temperature and wirelessly transmitting a temperature sensing signal corresponding to the sensed body-temperature. Specifically, the temperature sensing block 120 includes a temperature sensor 60 for sensing temperature and generates a temperature sensing signal corresponding to the sensed temperature, an analog/digital (A/D) converter 70 for converting the analog temperature sensing signal to a digital signal, a control unit 80 for instructing the temperature sensor 60 to periodically operate and collecting the temperature sensing signal, a timer 85 for checking time so as to enable the temperature sensor 60 to periodically operate, and a transmission unit 90 for transmitting the temperature sensing signal to the receiver 10.

The temperature sensing block 120 is sealed to be prevented from being polluted but includes a pair of connecting terminals 122 and 124 which are exposed to be electrically connected to the pair of the battery terminals 116 and 118. The temperature sensing block 120 may be attached to the center portion of the pad 105 so that the first and second connecting terminals 122 and 124 are connected to the first and second battery terminals 116 and 118, respectively. The pad 105 is provided with a bracket 110 for defining a position of the attached temperature sensing block 120 and supporting the temperature sensing block 120 attached to the pad 105 so that the temperature sensing block 120 is not moved.

As long as the pair of the battery terminals 116 and 118 of the battery 115 are electrically connected to the pair of the connecting terminals 122 and 124, respectively, the temperature sensor 60, the A/D converter 70, the control unit 80, the timer 85, and the transmission unit 90 of the temperature sensing block 120 are supplied with power from the battery 115 to operate, and the temperature sensing block 120 does not require additional elements such as an on/off switch that is mechanically operated, a capacitive switch, and an activation unit for applying an activation signal in wiredly or wirelessly.

In order for the temperature sensing block 120 to stably operate, the battery terminals 116 and 118 have to be reliably connected to the connecting terminals 122 and 124 in a state where the temperature sensing block 120 is attached to the pad 105. According to the exemplary embodiment of the present invention, in order to increase the reliability of the connection, the first and second battery terminals 116 and 118 and the first and second connecting terminals 122 and 124 may be connected by conductive snap fasteners, respectively. Specifically, the battery terminals 116 and 118 are provided with male snap fasteners (not shown), and the connecting terminals 122 and 124 are provided with female snap fasteners (not shown) corresponding to the male snap fasteners, so that the female snap fasteners of the connecting terminals 122 and 124 are engaged with the male snap fasteners of the battery terminals 116 and 118, respectively, when the temperature sensing block 120 is attached to the pad 105.

According to another exemplary embodiment of the present invention, the first and second battery terminals 116 and 118 and the first and second connecting terminals 122 and 124 may be connected by conductive Velcro fasteners, respectively. Specifically, the battery terminals 116 and 118 are provided with Velcro loop surfaces (not shown), and the connecting terminals 122 and 124 are provided with Velcro hook surfaces (not shown) corresponding to the Velcro loop surfaces, so that the Velcro hook surfaces of the connecting terminals 122 and 124 are engaged with the Velcro loop surfaces of the battery terminals 116 and 118, respectively, when the temperature sensing block 120 is attached to the pad 105. According to another exemplary embodiment of the present invention, the first and second battery terminals 116 and 118 and the first and second connecting terminals 122 and 124 may be connected by using a conductive gel as a medium.

As described above, when the temperature sensing block 120 is attached to the pad 105 so that the pair of the connecting terminals 122 and 124 are connected to the pair of the battery terminals 116 and 118, the temperature sensing block 120 operates to sense temperature. Thereafter, when the pad 105 is attached to the human body so that the temperature sensing block 120 contacts the skin, a temperature sensing signal corresponding to temperature is generated by the temperature sensor 60 of the temperature sensing block 120. The temperature sensing signal is converted into a digital signal by the A/D converter 70 and wirelessly transmitted by the transmission unit 90. Specifically, as the timer 85 performs time check, the temperature sensor 60 senses the temperature at intervals such as 30 minutes or an hour and generates the temperature sensing signal corresponding to the temperature, and the generated temperature sensing signal may be wirelessly transmitted by the transmission unit 90.

The transmission unit 90 may insert an identification (ID) code corresponding to the temperature sensing block 120 into the temperature sensing signal to be wirelessly transmitted. Therefore, when the body-temperature measuring system is configured to include a plurality of body-temperature measuring devices 101 and a single receiver 10 so that temperatures of a plurality of persons are simultaneously measured, the receiver 10 can identify the source of the received temperature sensing signal by using the ID code.

The receiver 10 includes a reception unit 20 for wireless receiving the temperature sensing signal wirelessly transmitted from the temperature sensing block 120, a processor 30 for measuring the temperature by using the received temperature sensing signal, a data storage unit 40 for storing data on the measured temperature, and a result feedback unit 50 for informing the user of a result of measuring the temperature.

The result feedback unit 50 displays the result of measuring the temperature on a display panel (not shown) by using a visible image such as a graph and numerals. When a plurality of temperature sensing signals are wirelessly received from a plurality of the temperature sensing blocks 120, results of measuring temperatures may be identified by using different ID codes. In addition, when the measured temperature is higher than a normal temperature, the result feedback unit 50 may inform the user of the fact by using beeps, warning lights, warning images, and the like. The receiver 10 may be a receiver which includes a hospital repeater and a server, and is used in a hospital or a small-sized home receiver having a simple structure. The home receiver may further include an infrared thermometer for measuring temperature by illuminating ear canal with infrared rays.

In the body-temperature measuring system 100, the body-temperature measuring device 101 automatically measures temperature when attached to the human body, and a result of measuring can be obtained by the receiver 10. Therefore, the inconvenience of a patient and a protector that may occur when the temperature is measured in a conventional method can be reduced.

Figure 4:
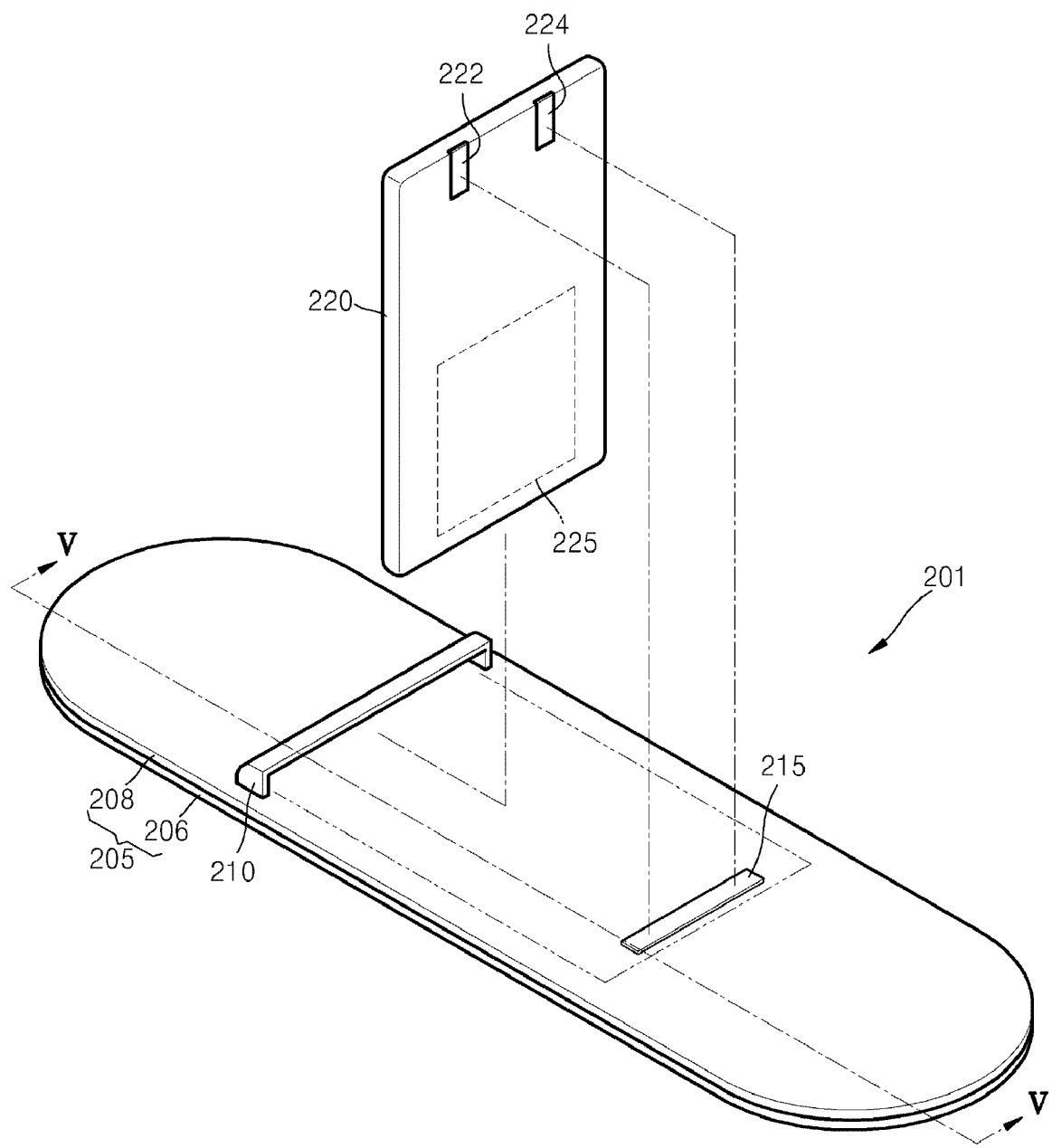
FIG. 4 is an exploded perspective view of a body-temperature measuring device according to another exemplary embodiment of the present invention.
Figure 5:
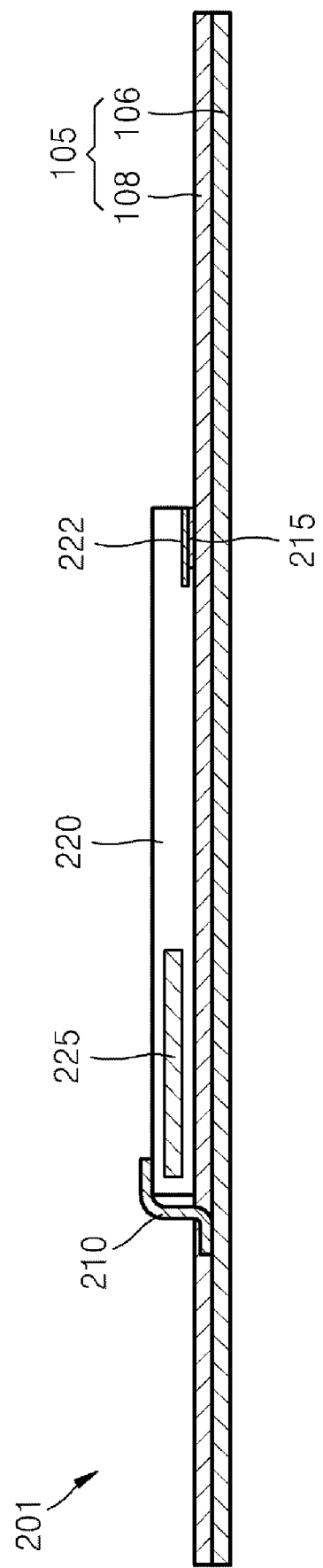
FIG. 5 is a cross-sectional view taken along line V-V of FIG. 4, according to an exemplary embodiment of the present invention.

FIG. 4 is an exploded perspective view of a body-temperature measuring device according to another exemplary embodiment of the present invention. FIG. 5 is a cross-sectional view taken along line V-V of FIG. 4.

Referring to FIGS. 3 to 5, similar to the body-temperature measuring system 100 described with reference to FIG. 3, a body-temperature measuring system 200 according to the current exemplary embodiment of the present invention includes a body-temperature measuring device 201 which is attached to the human body to sense temperature and wirelessly transmits a temperature sensing signal corresponding to the sensed temperature, and a receiver 10 which receives the wirelessly transmitted temperature sensing signal to measure the temperature. The body-temperature measuring device 201 includes a pad 205 that is attachable to and detachable from the human body, a conductive line 215 provided on a surface of the pad 215 facing the human body, and a temperature sensing block 220 that is attachable to and detachable from the surface of the pad 205 facing the human body.

The pad 205 may be a pad having a shape similar to a disposable bandage attached to protect a skin injury and may include a flexible first sheet 206 and a second sheet 208 which is overlapped and adhered to the first sheet 206. A surface of the second sheet 208 facing the human body is applied with an adhesive (not shown) so as to be attached to and detached from the skin. The conductive line 215 extends in a direction of a width of the pad 205 at the center portion of the pad 205.

The temperature sensing block 220 is attached to the center portion of the side surface facing the human body of the second sheet 208 applied with the adhesive, and includes units for contacting the human body, that is, the skin to sense temperature and wirelessly transmitting a temperature sensing signal corresponding to the sensed temperature. Specifically, the units for sensing the temperature and wirelessly transmitting the temperature sensing signal may include the temperature sensor 60, the A/D converter 70, the control unit 80, the timer 85, and the transmission unit 90 as described above with reference to FIG. 3.

The temperature sensing block 220 includes a battery 225 for supplying power to the temperature sensor 60, the A/D converter 70, the control unit 80, the timer 85, and the transmission unit 90. The battery 215 may be a non-rechargeable battery or a rechargeable battery.

The temperature sensing block 220 is sealed to be prevented from being polluted but includes a pair of connecting terminals 222 and 224 which are exposed to be electrically connected through the conductive line 215. The battery 225, the temperature sensor 60, the A/D converter 70, the control unit 80, the timer 85, and the transmission unit 90 are designed to form a closed circuit when the pair of the connecting terminals 222 and 224 are connected to each other.

The temperature sensing block 220 may be attached to the center portion of the pad 205 so that the first and second connecting terminals 222 and 224 are connected to a portion and the other portion of the conductive line 215, respectively. The pad 205 is provided with a bracket 210 for defining a position of the attached temperature sensing block 220 and supporting the temperature sensing block 220 attached to the pad 205 so that the temperature sensing block 220 is not moved.

As long as the temperature sensing block 220 is attached to the center portion of the pad 205, and the first and second connecting terminals 222 and 224 are electrically connected to the portion and the other portion of the conductive line 215, respectively, the temperature sensor 60, the A/D converter 70, the control unit 80, the timer 85, and the transmission unit 90 of the temperature sensing block 220 are applied with power from the battery 225 to operate and the temperature sensing block 220 does not require additional elements such as an on/off switch that is mechanically operated, a capacitive switch, and an activation unit for applying an activation signal in wired or wirelessly.

In order for the temperature sensing block 220 to stably operate, the pair of the connecting terminals 222 and 224 have to be reliably connected to the conductive line 215 in a state where the temperature sensing block 220 is attached to the pad 105. According to the exemplary embodiment of the present invention, in order to increase the reliability of the connection, the pair of the connecting terminals 222 and 224 are connected to the conductive line 215 by conductive snap fasteners. Specifically, the portion and the other portion of the conductive line 215 are provided with male snap fasteners (not shown), and the pair of the connecting terminals 222 and 224 are provided with female snap fasteners (not shown) corresponding to the male snap fasteners, so that the female snap fasteners of the connecting terminals 222 and 224 are engaged with the male snap fasteners of the conductive line 215 when the temperature sensing block 220 is attached to the pad 205.

According to another exemplary embodiment of the present invention, the conductive line 215 and the pair of the connecting terminals 222 and 224 may be connected by conductive Velcro fasteners. Specifically, the portion and the other portion of the conductive line 215 are provided with Velcro loop surfaces (not shown), and the connecting terminals 222 and 224 are provided with Velcro hook surfaces (not shown) corresponding to the Velcro loop surfaces, so that the Velcro hook surfaces of the pair of the connecting terminals 222 and 224 are attached to the Velcro loop surfaces of the conductive line 215 when the temperature sensing block 220 is attached to the pad 205. According to another exemplary embodiment of the present invention, the conductive line 215 and the pair of the connecting terminals 222 and 224 may be connected by using a conductive gel as a medium.

As described above, when the temperature sensing block 220 is attached to the pad 205 so that the pair of the connecting terminals 222 and 224 are connected to the conductive line 215, the temperature sensing block 220 operates to sense temperature. Thereafter, when the pad 205 is attached to the human body so that the temperature sensing block 220 contacts the skin, a temperature sensing signal corresponding to temperature is generated by the temperature sensor 60 of the temperature sensing block 220.

The temperature sensing signal is converted into a digital signal by the A/D converter 70 and wirelessly transmitted by the transmission unit 90. Specifically, as the timer 85 performs time check, the temperature sensor 60 senses the temperature at intervals such as 30 minutes or an hour and generates the temperature sensing signal corresponding to the temperature, and the generated temperature sensing signal may be wirelessly transmitted by the transmission unit 90.

The transmission unit 90 may insert an identification (ID) code corresponding to the temperature sensing block 220 into the temperature sensing signal to be wirelessly transmitted. Therefore, when the body-temperature measuring system is configured to include a plurality of body-temperature measuring devices 201 and a single receiver 10 so that temperatures of a plurality of persons are simultaneously measured, the receiver 10 can identify the source of the received temperature sensing signal by using the ID code.

The receiver 10 includes the reception unit 20, the processor 30, the data storage unit 40, and the result feedback unit 50 as described above with reference to FIG. 3. Since the receiver 10 is described above, a detailed description thereof is omitted.

While the present invention has been particularly shown and described with reference to exemplary embodiments thereof, it will be understood by those skilled in the art that various changes in form and details may be made therein without departing from the spirit and scope of the present invention as defined by the appended claims.

What is claimed is:

1. A body-temperature measuring device comprising:
a pad which is attachable to and detachable from a human body;
a battery which is mounted on the pad and includes a pair of battery terminals for supplying power; and
a temperature sensing block which is attachable to and detachable from the pad, and comprises:
units for contacting the human body to sense temperature and wirelessly transmitting a temperature sensing signal corresponding to the sensed temperature; and
a pair of connecting terminals which are electrically connected to the battery terminals only when the temperature sensing block is attached to the pad,
wherein the battery is disposed outside the temperature sensing block, and
wherein, when the temperature sensing block is attached to the pad, the battery and the temperature sensing block are disposed adjacently to each other on the pad, and having a bottom surface of the battery and a bottom surface of the temperature sensing block facing one side of the pad.

2. The body-temperature measuring device of claim 1, wherein the units for sensing the temperature and wirelessly transmitting the temperature sensing signal operate as long as the pair of the battery terminals and the pair of the connecting terminals are electrically connected, respectively.

3. The body-temperature measuring device of claim 1, wherein the temperature sensing block is sealed to be prevented from being polluted.

4. The body-temperature measuring device of claim 1, wherein the temperature sensing block periodically senses temperature and transmits the temperature sensing signal.

5. The body-temperature measuring device of claim 1, wherein the battery terminals and the connecting terminals are connected by conductive snap fasteners or conductive Velcro fasteners or by using a conductive gel as a medium.

6. The body-temperature measuring device of claim 1, wherein the pad comprises a bracket for supporting the temperature sensing block attached to the pad so that the temperature sensing block is not moved.

7. The body-temperature measuring device of claim 1, wherein the pad comprises at least a bracket, an upper layer and a lower layer,
wherein the temperature sensing block is attachable to the pad using a bracket provided on the pad, and the battery is inserted between the upper layer and the lower layer, and
wherein the bottom surface of the temperature sensing block faces a top surface of the upper layer, and the bottom surface of the battery faces a top surface of the lower layer, a top surface of the battery facing a bottom surface of the upper layer.

8. A body-temperature measuring system comprising:
one or more body-temperature measuring device comprising:
a pad which is attachable to and detachable from a human body;
a battery which is mounted on the pad and comprises a pair of battery terminals for supplying power;
and a temperature sensing block which is attachable to and detachable from the pad and comprises units for contacting the human body to sense temperature and wirelessly transmitting a temperature sensing signal corresponding to the sensed temperature, and a pair of connecting terminals which are electrically connected to the battery terminals only when the temperature sensing block is attached to the pad; and
a receiver which receives the wirelessly transmitted temperature sensing signal, measures the temperature by using the received signal, and informs of a result of measuring the temperature,
wherein the battery is disposed outside the temperature sensing block, and
wherein, when the temperature sensing block is attached to the pad, the battery and the temperature sensing block are disposed adjacently to each other on the pad, and having a bottom surface of the battery and a bottom surface of the temperature sensing block facing one side of the pad.

9. The body-temperature measuring system of claim 8, wherein the receiver informs of the result by using beeps, warning lights, or warning images.

10. The body-temperature measuring system of claim 8,
wherein the body-temperature measuring system comprises a plurality of the body-temperature measuring devices,
wherein a temperature sensing block included in each of the body-temperature measuring devices inserts an identification (ID) code into the temperature sensing signal to be wirelessly transmitted, and
wherein the receiver identifies the source of the wirelessly received temperature sensing signal by using the ID code.

11. The body-temperature measuring system of claim 8, wherein the pad comprises at least a bracket, an upper layer and a lower layer,
wherein the temperature sensing block is attachable to the pad using a bracket provided on the pad, and the battery is inserted between the upper layer and the lower layer, and
wherein the bottom surface of the temperature sensing block faces a top surface of the upper layer, and the bottom surface of the battery faces a top surface of the lower layer, a top surface of the battery facing a bottom surface of the upper layer.

* * * * *